2,999,843
POLY-ALPHA-OLEFINS STABILIZED WITH 2-HYDROXY-4-PENTADECYLBENZOPHENONE

Alfred Johannes Porck, Tonawanda, N.Y., assignor to E. I. du Pont de Nemours and Company, Wilmington, Del., a corporation of Delaware
No Drawing. Filed Oct. 12, 1959, Ser. No. 845,668
6 Claims. (Cl. 260—45.95)

This invention relates to the stabilization of polyolefin compositions, and more particularly, to the stabilization of polyethylene compositions against deterioration resulting from exposure to sunlight or ultraviolet light.

Polyethylene is subject to deterioration when exposed to ultraviolet light. A number of so-called ultraviolet inhibitors are known which are used to inhibit the deterioration or degradation of many plastic or resin materials. However, some of the most effective of these known ultraviolet inhibitors for other plastic materials such as cellulose acetate, polystyrene, polyvinyl chloride and the like are not compatible with the polyolefins such as polyethylene due to exudation from the polyethylene soon after being incorporated therein. Also, there are other common ultraviolet inhibitors that are compatible with, but are not entirely satisfactory stabilizers for, polyethylene. In addition, many effective stabilizers for halogen-containing polymers such as polyvinyl chloride, polyvinylidene chloride, and the like are not necessarily effective stabilizers in polyethylene, as stabilizers in halogen-containing polymers function essentially as halide scavengers while stabilizers in polyethylene do not serve this function. Hence, it is highly unpredictable as to whether a given stabilizer or ultraviolet inhibitor will be compatible with, and a good stabilizer for, polyolefin compositions short of actually testing the material in the polyolefin.

It is an object of this invention to provide new polyolefin compositions of high stability against deterioration resulting from exposure to sunlight or ultraviolet light.

It is a further object of this invention to provide novel polyethylene compositions containing an additive that is compatible with, and an effective ultraviolet inhibitor for, the polyethylene compositions.

It is likewise an object of this invention to provide novel polyethylene compositions containing a hydroxybenzophenone ultraviolet inhibitor that will not exude therefrom.

Other objects of the invention will be apparent from the description and claims which follow.

The present invention comprises polyolefin compositions of improved resistance to deterioration due to ultraviolet light having incorporated therein a stabilizing amount of a 2-hydroxy-4-pentadecylbenzophenone which has the following structural formula:

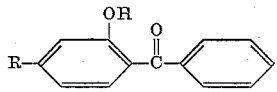

wherein R is an alkyl radical containing 15 carbon atoms in a straight chain.

The subject ultraviolet inhibitor can be used to stabilize a wide variety of olefinic polymer compositions including both "low-density" and "high-density" polyethylene. Conventional polyethylene, "low-density" polyethylene, usually has a density of about 0.91 to 0.93 and can be prepared by several methods including the method disclosed in U.S. Patent 2,153,553. "High-density" polyethylene usually has a density of about 0.94 to 0.97 and can be prepared by such methods as are disclosed in U.S. Patent 2,816,883. The subject stabilizer can also be used as an ultraviolet inhibitor for polymers of propylene, 1-butene, 1-pentene, and 1-hexene. The subject inhibitor is of particular utility in thin films or sheets of polyethylene compositions, particularly those about 0.5–100 mils in thickness.

The amount of 2-hydroxy-4-pentadecylbenzophenone employed in polyolefin compositions can be widely varied, the stabilizing amount varying with the particular use to which the polyolefin composition is to be put. Concentrations of 2-hydroxy-4-pentadecylbenzophenone of .0005% to 10% are more generally used and concentrations og 1% to 5% are preferably employed, the concentrations being based on the weight of the polyolefin composition.

The ultraviolet inhibitor of the invention can be incorporated or blended into polyethylene compositions by any of the conventional methods used for blending such materials into resins or plastics. Typical of such methods that can be suitably employed including milling on heated rolls, deposition from solvents and dry-blending.

The ultraviolet inhibitor of the present invention, 2-hydroxy-4-pentadecylbenzophenone, lends to polyolefin compositions improved stability, and more specifically, improved stability against deterioration resulting from exposure to sunlight or ultraviolet light. Thus, polyolefin compositions stabilized in accordance with the invention can be utilized as films, filaments, tubing, etc., in greenhouses, exterior screening, automobile exteriors, garden hose, etc.

The polyolefin stabilizer of the invention, apart from being an effective stabilizer against deterioration resulting from exposure to ultraviolet light, has good compatibility with polyethylene compositions. For example, while the subject 2-hydroxy-4-pentadecylbenzophenone has good compatibility with polyethylene compositions, such closely related hydroxybenzophenones as 2-hydroxybenzophenone, 2 - hydroxy - 4 - decoxybenzophenone, and many other hydroxybenzophenones are not compatible with polyethylene compositions in that these compounds exude from polyethylene compositions after being compounded therein.

A still further and very important advantage of this stabilizer is that the alkylphenol from which it is derived is obtained from a natural product and is much lower in cost than the intermediates for conventionally employed stabilizers. Hence, substantial economies can be effected in the manufacture of weatherable polyolefin films.

The effectiveness of 2-hydroxy-4-pentadecylbenzophenone as a stabilizer against photodegradation or ultraviolet light deterioration in polyolefins is illustrated by the following examples.

EXAMPLE 1

*Preparation of 2-hydroxy-4-pentadecylbenzophenone*

To 91.2 grams of 3-pentadecylphenol there was added 75 ml. of benzoyl chloride dissolved in 180 ml. of anhydrous pyridine over a period of one hour at a temperature of 0° C. The benzoylation reaction mixture was allowed to stand overnight at room temperature. The reaction mixture was poured over ice whereupon white crystals precipitated. The white crystals, which were sparingly soluble in lower alcohols, were recrystallized from a 20/80 benzene/methanol mixture to give a product, 3-pentadecylphenyl benzoate, with a melting point of 50° C.

Four grams (.01 mole) of the 3-pentadecylphenyl benzoate was heated at 160–175° C. for 10 minutes in the presence of 1.6 grams (.012 mole) of anhydrous aluminum chloride in an atmosphere of dry nitrogen. The reaction product was allowed to cool, and was then treated with a mixture of ice and concentrated hydrochloric acid, filtered and the residue was dissolved in ether. The ether solution was washed with water, dried and evaporated to give an almost quantitative yield of 2-hydroxy-4-pentadecylbenzophenone. The product, in the form of slightly yellow crystals, was sparingly soluble in methanol or ethanol but was readily soluble in cyclohexanone. The melting point of the purified crystals was 43° C. Chemical analysis provided the following: Carbon, 82.45%; hydrogen, 9.78%; oxygen, 7.81%. (Calculated for $C_{28}H_{40}O_2$: Carbon, 82.31%; hydrogen, 9.87%; oxygen, 7.84%.)

Polyethylene film containing the 2-hydroxy-4-pentadecylbenzophenone was made by working a polyethylene resin having a weight average molecular weight of 300,000–500,000, a melt index of 2.2, and a density of 0.9229 and 3%, based on the weight of the resin, of the adjuvant on a rubber mill for 15 minutes at 125° C. Thereafter, the composition was extruded in film form at a temperature of about 275° C.

Samples of the polyethylene film containing 2-hydroxy-4-pentadecylbenzophenone were submitted to outdoor exposure tests in Florida. They remained flexible after nine months.

As Control A, a film made from the same polyethylene resin without a stabilizer was completely disintegrated at the end of the nine-month test.

As Control B, a film made from the same polyethylene resin and containing initially 3% of 2-hydroxybenzophenone showed evidence of exudation of the stabilizer and the sample was completely disintegrated at the end of the nine-month test.

EXAMPLE 2

A polypropylene resin having a melt index of 0.9 and a density of 0.8912 was milled with 3%, based on the weight of the resin, of 2-hydroxy-4-pentadecylbenzophenone. The resulting composition was extruded in the form of a film at a temperature of 300° C.

Samples of the polypropylene film containing the benzophenone were tested by exposure to Florida weather. They retained their properties substantially after a period of nine months.

A control film of polypropylene resin had completely deteriorated after the nine-month exposure.

Having fully described the invention, what is claimed is:

1. A poly-alpha-olefin composition containing dispersed therein 0.0005% to 10% by weight of a 2-hydroxy-4-pentadecylbenzophenone as an agent to inhibit deterioration of said polyolefin composition by ultraviolet light.

2. A polyethylene composition containing dispersed therein 0.0005% to 10% by weight of 2-hydroxy-4-pentadecylbenzophenone as an agent to inhibit deterioration of said polyethylene composition by ultraviolet light.

3. A polyethylene composition containing dispersed therein 1% to 5% by weight of 2-hydroxy-4-pentadecylbenzophenone as an agent to inhibit deterioration of said polyethylene composition by ultraviolet light.

4. A polyethylene film containing dispersed therein 1% to 5% by weight of 2-hydroxy-4-pentadecylbenzophenone as an agent to inhibit deterioration of said polyethylene film by ultraviolet light.

5. A polypropylene composition containing dispersed therein 0.0005% to 10% by weight of 2-hydroxy-4-pentadecylbenzophenone as an agent to inhibit deterioration of said polypropylene composition by ultraviolet light.

6. A polypropylene film containing dispersed therein 1% to 5% by weight of 2-hydroxy-4-pentadecylbenzophenone as an agent to inhibit deterioration of said polypropylene film by ultraviolet light.

References Cited in the file of this patent

UNITED STATES PATENTS 2,887,466     Lappin et al.  ------------ May 19, 1959